United States Patent
Bono et al.

(10) Patent No.: US 11,367,886 B2
(45) Date of Patent: Jun. 21, 2022

(54) FUEL CELL SYSTEM AND METHOD OF CONTROLLING FUEL CELL SYSTEM

(71) Applicant: TOYOTA JIDOSHA KABUSHIKI KAISHA, Toyota (JP)

(72) Inventors: Tetsuya Bono, Miyoshi (JP); Toshihiro Egawa, Okazaki (JP); Masahiro Okuyoshi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 70 days.

(21) Appl. No.: 16/275,418

(22) Filed: Feb. 14, 2019

(65) Prior Publication Data
US 2019/0260049 A1 Aug. 22, 2019

(30) Foreign Application Priority Data
Feb. 22, 2018 (JP) .............................. JP2018-029346

(51) Int. Cl.
*H01M 8/04858* (2016.01)
*H01M 8/04082* (2016.01)
(Continued)

(52) U.S. Cl.
CPC ... *H01M 8/04902* (2013.01); *H01M 8/04201* (2013.01); *H01M 8/04432* (2013.01); *H01M 8/04753* (2013.01)

(58) Field of Classification Search
CPC ......... H01M 8/04902; H01M 8/04201; H01M 8/04432; H01M 8/04753; H01M 8/0488; H01M 8/04858; H01M 8/0438; H01M 8/04104; H01M 8/04298; H01M 8/0662; H01M 2250/20
(Continued)

(56) References Cited

U.S. PATENT DOCUMENTS 10,359,754 B2 * 7/2019 Tano .................... H01M 8/0488
2009/0315396 A1 * 12/2009 Ichikawa ................ B60L 58/24
307/24
(Continued)

FOREIGN PATENT DOCUMENTS

JP 2015-201407 11/2015

OTHER PUBLICATIONS

Woo et al., PEM fuel cell current regulation by fuel feed control, Elsevier, Chemical Engineering Science, 62 (2007), p. 957-968. (Year: 2007).*

*Primary Examiner* — Christian Roldan
(74) *Attorney, Agent, or Firm* — Finnegan, Henderson, Farabow, Garrett & Dunner, LLP

(57) ABSTRACT

The power controller starts imposing the current limit when a condition for the current limit is met the condition, the condition being that the fuel cell does not generate to fulfill the requested amount of power generation while the fuel cell generates power at an upper limit of the supply capability of the fuel gas supply unit, and the power controller removes the current limit at a first predetermined increase rate determined when the requested amount of power generation exceeds a predetermined threshold below a rated power generation amount of the fuel cell and at a second increase rate higher than the first increase rate when the requested amount of power generation is the threshold or less, after the condition for the limit is dissolved.

7 Claims, 3 Drawing Sheets

(51) Int. Cl.
*H01M 8/0438* (2016.01)
*H01M 8/04746* (2016.01)

(58) Field of Classification Search
USPC .......................................................... 429/444
See application file for complete search history.

(56) References Cited

U.S. PATENT DOCUMENTS

| | | | | |
|---|---|---|---|---|
| 2010/0068576 | A1* | 3/2010 | Hamada | H01M 8/04589 |
| | | | | 429/444 |
| 2010/0136447 | A1* | 6/2010 | Kumei | H01M 8/04082 |
| | | | | 429/431 |
| 2010/0203409 | A1* | 8/2010 | Manabe | H01M 8/04037 |
| | | | | 429/432 |
| 2010/0248055 | A1* | 9/2010 | Imanishi | H01M 8/04552 |
| | | | | 429/432 |
| 2012/0270126 | A1* | 10/2012 | Matsumoto | H01M 8/04492 |
| | | | | 429/429 |
| 2016/0132035 | A1* | 5/2016 | Tano | H01M 8/04559 |
| | | | | 700/295 |
| 2018/0183077 | A1* | 6/2018 | Ohkuwa | H01M 8/04302 |
| 2019/0273274 | A1* | 9/2019 | Goto | H02M 7/48 |

* cited by examiner

FUEL CELL SYSTEM AND METHOD OF CONTROLLING FUEL CELL SYSTEM

CROSS-REFERENCE TO RELATED APPLICATION

The present application claims priority from Japanese application No. 2018-029346 filed on Feb. 22, 2018, the content of which is hereby incorporated in its entirety by reference into this application.

BACKGROUND

Field

The present disclosure relates to a fuel cell system and a method of controlling the fuel cell system.

Related Art

A fuel cell system includes a mechanism such as an injector for supplying fuel gas for power generation to a fuel cell. The fuel cell system is designed to allow supply of the fuel cell with enough fuel gas to generate power of a rated amount defined as an upper limit for a requested amount of power generation requested from the outside. Not only fuel gas to be consumed for power generation but also fuel gas irrelevant to power generation exists in such a fuel cell. Hence, generating power of an amount approximate to the rated amount may lose balance between supply and consumption of fuel gas. The fuel gas irrelevant to power generation includes fuel gas to move to a cathode side without contributing to power generation in a phenomenon called cross leakage, and fuel gas to be discharged together with impurity such as nitrogen gas or water when the impurity having moved from the cathode side to an anode side in the cross leakage phenomenon is discharged to the outside, for example. Hence, even when fuel gas is supplied by driving a supply system for the fuel gas to the maximum, the fuel gas may become insufficient for a requested amount of power generation. Operating the fuel cell forcibly under this condition causes the risk of degradation of the fuel cell. In response to such insufficiency of fuel gas, the fuel cell system disclosed in Japanese Patent Application Publication No. 2015-201407 performs a current limit of limiting a current to be output from a fuel cell to recover balance between supply and consumption of the fuel gas.

To remove the control over the current limit in the fuel cell, a current value to be taken out is desirably increased within the shortest possible period of time when a requested amount of power generation is large. The reason for this is as follows. In the case of a fuel cell system installed on a vehicle, for example, insufficient output from a fuel cell caused by imposition of a current limit arises a driver's feeling of worsened drivability. It has been found, however, that simply removing the current limit may necessitate imposition of an another current limit within a short period of time. Hence, further improvement has been desired in terms of how control over a current limit in a fuel cell is to be removed.

SUMMARY

According to one aspect of the present disclosure, a fuel cell system is provided. The fuel cell system comprises: a fuel cell generating power in response to supply of fuel gas; a fuel gas supply unit supplying the fuel gas to the fuel cell; a power controller connected to a power supply line to receive generated power output from the fuel cell, the power controller being capable of doing a current limit to reduce at least a current value of power to be supplied to outside from the fuel cell; and a power generation controller controlling at least supply of the fuel gas supplied by the fuel gas supply unit to operate the fuel cell to fulfill a requested amount of power generation requested for the fuel cell. The power controller starts imposing the current limit when a condition for the current limit is met the condition, the condition being that the fuel cell does not generate to fulfill the requested amount of power generation while the fuel cell generates power at an upper limit of the supply capability of the fuel gas supply unit, and the power controller removes the current limit at a first predetermined increase rate determined when the requested amount of power generation exceeds a predetermined threshold below a rated power generation amount of the fuel cell and at a second increase rate higher than the first increase rate when the requested amount of power generation is the threshold or less, after the condition for the limit is dissolved.

According to this aspect, for removal of the current limit, the power controller removes the current limit at the first increase rate determined in advance when the requested amount of power generation exceeds the threshold determined in advance falling below a rated power generation amount of the fuel cell. This makes it possible to reduce the likelihood that a current limit will be imposed again during removal of the current limit. Meanwhile, when the requested amount of power generation is the threshold or less, the power controller removes the current limit at the second increase rate higher than the first increase rate. This allows the fuel cell to generate power of the requested amount of power generation easily.

DESCRIPTION OF THE EMBODIMENT

Figure 1:
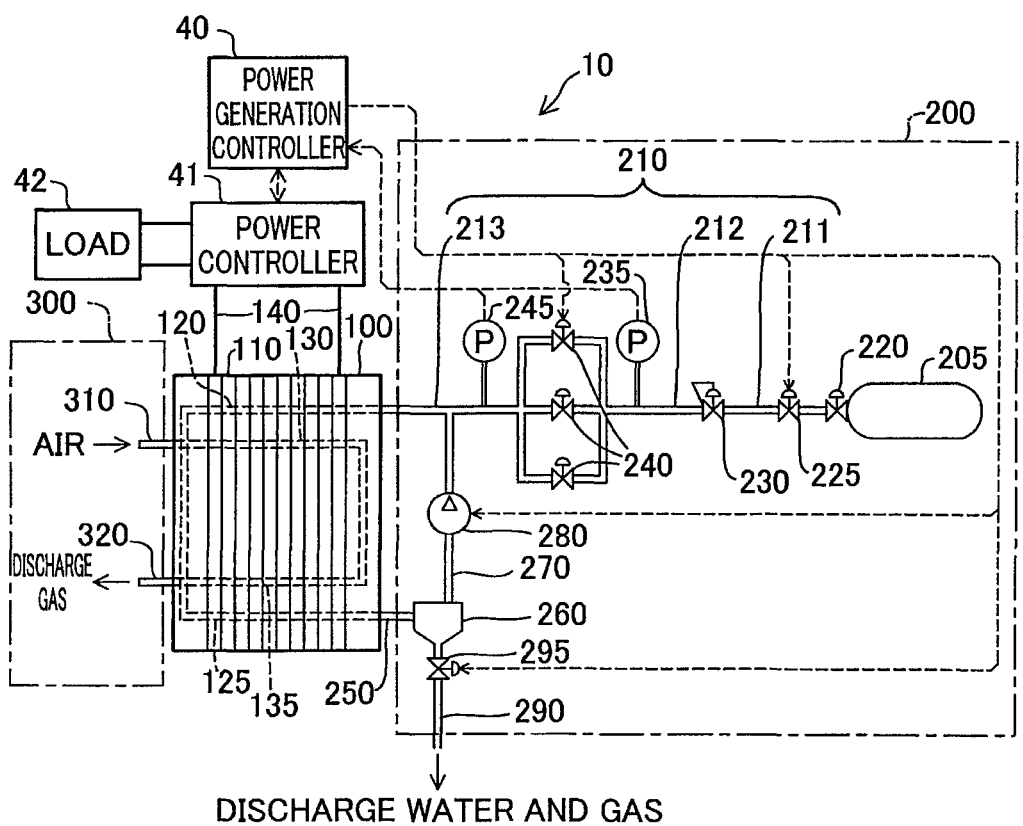
FIG. 1 is an explanatory view schematically showing the configuration of a fuel cell system.

FIG. 1 is an explanatory view schematically showing the configuration of a fuel cell system 10. The fuel cell system 10 may be installed on a vehicle, for example. The fuel cell system 10 includes a fuel cell 100, a fuel gas supply unit 200, an oxidizing gas supply unit 300, a power generation controller 40, a power controller 41, and a load 42. If the fuel cell system 10 is installed on a vehicle, the load 42 is a motor for driving the vehicle, for example.

The fuel cell 100 includes multiple stacked power generation units 110 and generates power by causing reaction between fuel gas and oxidizing gas. In this embodiment, hydrogen is used as the fuel gas, and air is used as the oxidizing gas. The power generation unit 110 includes an anode, a cathode, and an electrolyte membrane between the anode and the cathode. These elements will not be illustrated in the drawings and will not be described. The fuel gas is supplied to the anode of the power generation unit 110 through a fuel gas supply manifold 120, and discharged to a fuel gas discharge manifold 125. The oxidizing gas is supplied to the cathode of the power generation unit 110 through an oxidizing gas supply manifold 130, and discharged to an oxidizing gas discharge manifold 135. Power generated by the fuel cell 100 is supplied through the power controller 41 to the load 42.

The fuel gas supply unit 200 includes a fuel gas tank 205, a fuel gas supply pipe 210, a main stop valve 220, a shutoff valve 225, a regulator 230, an injector 240, a fuel gas discharge pipe 250, a gas-liquid separator 260, a reflux pipe 270, a reflux pump 280, a gas and water discharge pipe 290, a gas and water discharge valve 295, a pressure sensor 235, and a pressure sensor 245.

The fuel gas tank 205 stores hydrogen as the fuel gas. The fuel gas supply pipe 210 connects the fuel gas tank 205 and the fuel gas supply manifold 120 of the fuel cell 100. The following elements are installed in the fuel gas supply pipe 210 in the following order as viewed from the fuel gas tank 205 toward the fuel cell 100: the main stop valve 220, the shutoff valve 225, the regulator 230, and the injector 240. The main stop valve 220 is a manual valve connected to the fuel gas tank 205 and used for switching between supplying and not supplying the fuel gas from the fuel gas tank 205. The shutoff valve 225 is a solenoid valve provided downstream from the main stop valve 220 and used for switching between supplying and not supplying the fuel gas in response to instruction from the power controller 41. The regulator 230 is provided downstream from the main stop valve 220 and used for reducing the pressure of the fuel gas to a predetermined pressure. The fuel gas existing in the fuel gas supply pipe 210 from the fuel gas tank 205 to the regulator 230 is at a high pressure. The fuel gas supply pipe 210 in this range is also called a "high-pressure fuel gas supply pipe 211."

The injector 240 is arranged downstream from the regulator 230. In response to instruction from the power controller 41, the injector 240 adjusts the pressure and the amount of the fuel gas and injects the adjusted fuel gas downstream, thereby supplying the fuel gas to the fuel cell 100. In this embodiment, the fuel gas supply unit 200 includes three injectors 240. Meanwhile, one or more injectors 240 may be provided. Increase in the number of the injectors 240 allows the fuel gas of a greater amount to be supplied to the fuel cell 100. The fuel gas existing in the fuel gas supply pipe 210 from the regulator 230 to the injector 240 is at a pressure lower than the pressure of the fuel gas in the high-pressure fuel gas supply pipe 211. The fuel gas supply pipe 210 from the regulator 230 to the injector 240 is also called a "medium-pressure fuel gas supply pipe 212." The pressure sensor 235 is installed in the medium-pressure fuel gas supply pipe 212.

The fuel gas supply pipe 210 downstream from the injector 240 is connected to the fuel gas supply manifold 120 of the fuel cell 100. The fuel gas existing in the fuel gas supply pipe 210 from the injector 240 to the fuel cell 100 is at a pressure lower than the pressure of the fuel gas in the medium-pressure fuel gas supply pipe 212. The fuel gas supply pipe 210 from the injector 240 to the fuel cell 100 is also called a "low-pressure fuel gas supply pipe 213." The pressure sensor 245 is installed in the low-pressure fuel gas supply pipe 213.

The fuel gas discharge pipe 250 is used for discharging fuel exhaust gas from the fuel cell 100 and is connected to the fuel gas discharge manifold 125 of the fuel cell 100. The gas-liquid separator 260 is connected to the fuel gas discharge pipe 250 to be downstream from the fuel gas discharge pipe 250. The gas-liquid separator 260 separates a gas component and a liquid component in the fuel exhaust gas from each other. The gas component in the fuel exhaust gas mainly includes fuel gas not having been consumed by the fuel cell 100, and nitrogen or water vapor having moved from a cathode to an anode through an electrolyte membrane (not shown) of the fuel cell 100. The liquid component includes water resulting from condensation of the water vapor having moved from the cathode to the anode through the electrolyte membrane. The reflux pipe 270 is used for causing the fuel gas not having been consumed by the fuel cell 100 to return to the low-pressure fuel gas supply pipe 213. The reflux pipe 270 connects the gas-liquid separator 260 and the low-pressure fuel gas supply pipe 213. The fuel gas not having been consumed by the fuel cell 100 is separated by the gas-liquid separator 260 to become a gas component, and is then fed to the low-pressure fuel gas supply pipe 213. The reflux pump 280 is installed in the reflux pipe 270. The reflux pump 280 prevents the fuel gas from flowing back from the low-pressure fuel gas supply pipe 213 toward the reflux pipe 270. The gas and water discharge pipe 290 is provided vertically below the gas-liquid separator 260. The gas and water discharge pipe 290 is used for discharging a liquid component in the gas-liquid separator 260 to the outside of the vehicle. The gas and water discharge valve 295 used for discharging water or nitrogen is installed in the gas and water discharge pipe 290. As the gas and water discharge valve 295 is opened, part of unreacted fuel gas is discharged together with water or nitrogen staying in the gas-liquid separator 260.

The oxidizing gas supply unit 300 includes an oxidizing gas supply pipe 310 and an oxidizing gas discharge pipe 320. The oxidizing gas supply pipe 310 is connected to the oxidizing gas supply manifold 130 of the fuel cell 100 and used for supplying the oxidizing gas to the fuel cell 100. The oxidizing gas discharge pipe 320 is connected to the oxidizing gas discharge manifold 135 of the fuel cell 100 and used for discharging oxidizing exhaust gas from the fuel cell 100 to the atmosphere.

The power generation controller 40 determines power requested to be generated by the fuel cell 100 (also called a "requested amount of power generation") using the amount of depression of an accelerator pedal and the speed of the vehicle on which the fuel cell system 10 is installed. Based on the determined requested amount of power generation, the power generation controller 40 controls the shutoff valve 225, the injector 240, the reflux pump 280, and the gas and water discharge valve 295 to control the amount or pressure of the fuel gas to be supplied to the fuel cell 100, thereby making the fuel cell 100 generate power. The power controller 41 is formed using a DC-DC converter or an inverter, for example. The power controller 41 supplies power received from the fuel cell 100 through a power supply line 140 to the external load 42. For this supply, the power controller 41 is capable of imposing a limit on a current to be drawn from the fuel cell 100.

Figure 2:
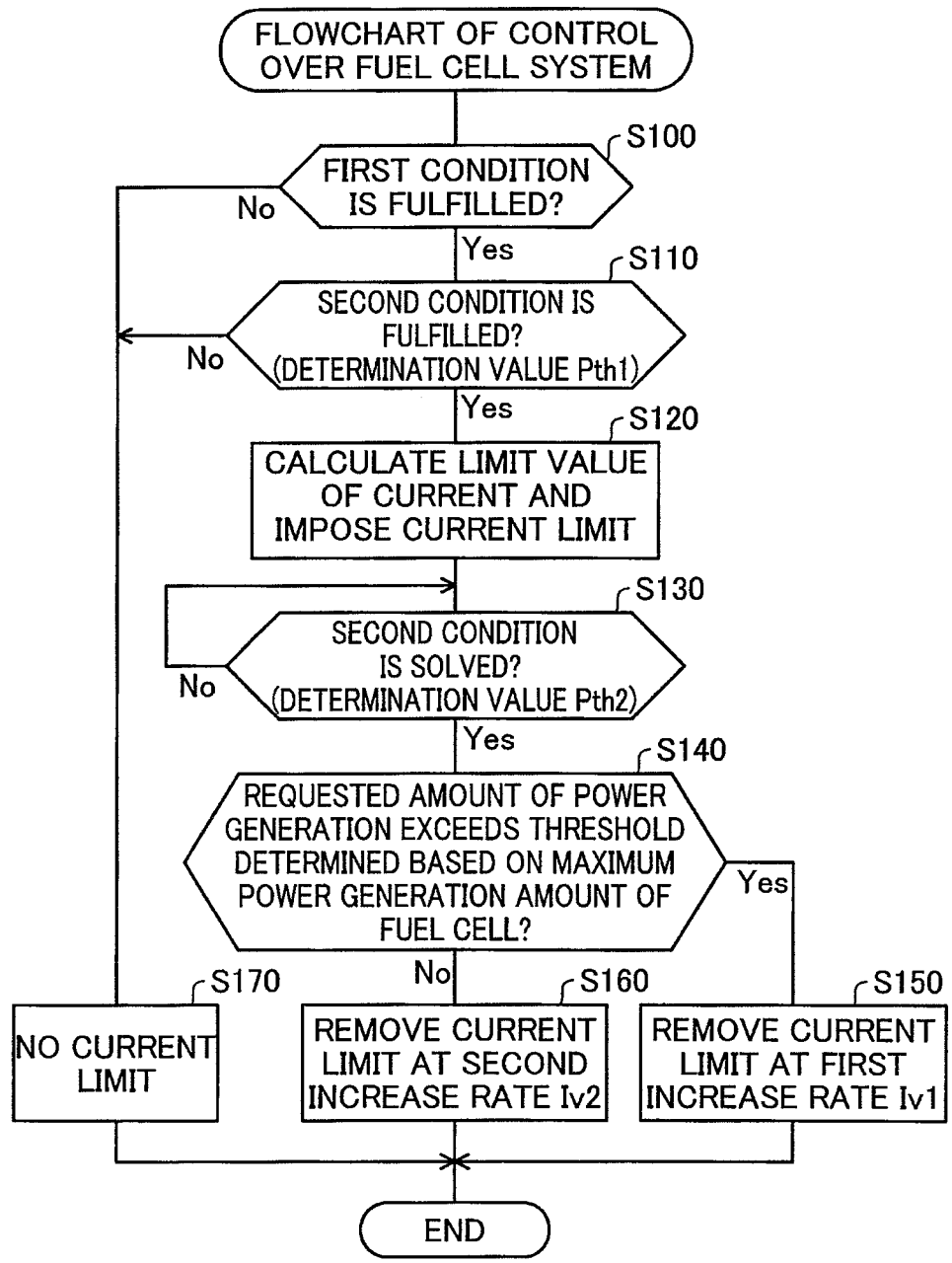
FIG. 2 is a flowchart of control over fuel cell system executed by a power controller.

FIG. 2 is a flowchart of control over the fuel cell system 10 executed by the power controller 41. After the fuel cell system 10 is started, the power controller 41 executes processing in the control flow chart shown in FIG. 2 repeatedly to coincide with predetermined timing.

In step S100, the power controller 41 determines whether a first condition is fulfilled under which a requested amount of power generation requested for the fuel cell 100 exceeds an upper limit range of power generation by the fuel cell 100. In the upper limit range of power generation by the fuel cell 100, the fuel cell 100 generates power at an upper limit of the supply capability of the fuel gas supply unit 200. Operation at the upper limit of the supply capability of the fuel gas supply unit 200 includes not only a case where a maximum number of the injectors 240 (in the first embodiment, three injectors 240) are used, are opened at a maximum duty, and inject the fuel gas, but also a case where the fuel gas necessary for power generation is supplied while the requested amount of power generation is approximate to a maximum power generation amount (rated power generation amount) of the fuel cell 100. If the fuel cell 100 is temporarily allowed to be operated so as to exceed the rated power generation amount, operation at the upper limit of the supply capability includes an operating state exceeding the rated power generation amount, specifically, short-time operation at the rated power generation amount. Thus, fulfilling the first condition means that the fuel cell 100 is in a range in which the amount of the fuel gas to be supplied from the injector 240 may be insufficient for a demanded amount of the fuel gas necessary for fulfilling the requested amount of power generation requested for the fuel cell 100. The demanded amount of the fuel gas is the sum of a consumed amount of the fuel gas to be consumed by the fuel cell 100 for generating power of the requested amount of power generation requested for the fuel cell 100, the amount of discharge of the fuel gas to be discharged to the atmosphere through the gas and water discharge valve 295 at the time of opening of the gas and water discharge valve 295, and the amount of the fuel gas to move from the anode to the cathode through the electrolyte membrane in the fuel cell 100. If the first condition is fulfilled, the power controller 41 goes to step S110. If the first condition is not fulfilled, the power controller 41 goes to step S170.

In step S110, the power controller 41 determines whether a second condition is fulfilled under which supply of the fuel gas is insufficient so generated power does not commensurate with the requested amount of power generation. As a specific example, the power controller 41 determines whether a difference $\Delta P$ between a pressure command value Pcom of the fuel gas in the low-pressure fuel gas supply pipe 213 and a measured value Pm of the pressure of the fuel gas in the low-pressure gas supply pipe 213 currently measured by the pressure sensor 245 is a first determination value Pth1 or more. The pressure command value Pcom shows the pressure of the fuel gas necessary for the fuel cell 100 to generate power of the requested amount of power generation. The first determination value Pth1 is 5 kPa, for example. If the second condition is determined to be fulfilled in step S110, the power controller 41 goes to step S120. The reason for this is that, in this case, the fuel cell 100 has difficultly in generating power of the requested amount of power generation. If the second condition is not fulfilled, the power controller 41 goes to step S170. The power controller 41 may go to step S120 not only if the second condition is fulfilled once but also if the second condition is fulfilled n times (n is an integer of two or more and may be five, for example) in a control cycle. Making the determination n times makes it possible to reduce the likelihood that imposition of a current limit will be started by erroneous determination.

In step S120, the power controller 41 determines a limit value of a current to be drawn from the fuel cell 100, and limits the current to be drawn from the fuel cell 100. The limit value of the current is smaller than a current value necessary for generating 85% of power corresponding to the requested amount of power generation, for example.

After the power controller 41 starts imposing the limit on the current to be drawn from the fuel cell 100, the power controller 41 determines in step S130 whether the second condition has been solved. If the second condition has been solved (In S130, Yes), the power controller 41 goes to step S140. If the second condition has not been solved (In S130, No), the power controller 41 executes step S130 repeatedly to continue imposing the current limit until the second condition is solved. For making the determination in step S130, the power controller 41 uses a second determination value Pth2 lower than the first determination value Pth1 instead of the first determination value Pth1. Specifically, even if the difference $\Delta P$ between the measured value Pm of the pressure of the fuel gas and the pressure command value Pcom of the fuel gas becomes less than the first determination value Pth1, the power controller 41 may continue imposing the current limit unless the difference $\Delta P$ becomes the second determination value Pth2 or less. This makes it possible to reduce the likelihood that a current limit will be imposed again after the current limit is removed. The second determination value Pth1 is 0 kPa, for example. In Step S130, the power controller 41 may also determine to go to step S140 not only if the second condition is solved once but also if the second condition is solved n times (n is an integer of two or more and may be five, for example) in a control cycle, for example.

In step S140, the power controller 41 determines whether the requested amount of power generation requested for the fuel cell 100 exceeds a threshold determined based on the maximum power generation amount of the fuel cell 100. The threshold is 85% of the maximum power generation amount of the fuel cell 100, for example. If the requested amount of power generation requested for the fuel cell 100 exceeds the threshold, the power controller 41 moves the processing to step S150. If the requested amount of power generation does not exceed the threshold, the power controller 41 moves the processing to step S160.

In step S150, the power controller 41 removes the limit on the current to be drawn from the fuel cell 100 at a first increase rate Iv1. The first increase rate Iv1 is set in advance in consideration of a period of time in which, if the current limit is removed at the first increase rate Iv1, water resulting from power generation by the fuel cell 100 stays as a liquid component in the gas-liquid separator 260, the liquid component and a gas component are discharged together in response to opening of the gas and water discharge valve 295 by the power controller 41, and discharging the gas component is relatively difficult compared to discharging only the gas component. The first increase rate Iv1 is set at a value that allows the current limit to be removed gradually. If the power controller 41 tries to discharge the liquid component in the gas-liquid separator 260 by opening the gas and water discharge valve 295 while the first increase rate Iv1 is used for removing the current limit, a substance to be discharged is not limited to the gas component. As a result, it becomes unlikely that the fuel gas in the gas-liquid separator 260 will be discharged to the atmosphere. This makes it possible to attain a balance easily between a demanded amount of the fuel gas and the amount of the fuel gas to be supplied, thereby facilitating recovery of power to be generated by the fuel cell 100.

The first increase rate Iv1 may be 1% of the fastest rate allowing recovery from the current limit. Assuming that the fastest rate allowing recovery from the current limit is 500 A/s, for example, the first increase rate Iv1 may be 5 A/s.

In step S160, the power controller 41 removes the limit on the current to be drawn from the fuel cell 100 at a second increase rate Iv2. The second increase rate Iv2 is higher than the first increase rate Iv1. For example, the second increase rate Iv2 is the fastest rate allowing recovery from the current limit such as 500 A/s. In this case, the requested amount of power generation requested for the fuel cell 100 does not exceed the threshold determined based on the maximum power generation amount of the fuel cell 100. Thus, a demanded amount of the fuel gas does not exceed an allowable amount of the fuel gas to be supplied. In this case, removing the current limit at the fastest rate does not lead to reduction in the amount of power to be generated by the fuel cell 100 to be caused by insufficient supply of the fuel gas. As a result, a driver is unlikely to have the feeling of worsened drivability. As long as the driver becomes unlikely to have the feeling of worsened drivability, the power controller 41 may remove the current limit at a rate lower than the fastest rate allowing recovery from the current limit (500 A/s). For example, the power controller 41 may employ a value corresponding to 80% or more of the fastest rate allowing recovery from the current limit as the second increase rate Iv2.

In step S170, the power controller 41 does not impose a limit on the current. The reason for this is that the risk of voltage drop due to insufficient supply of the fuel gas is low at the fuel cell 100.

Figure 3:
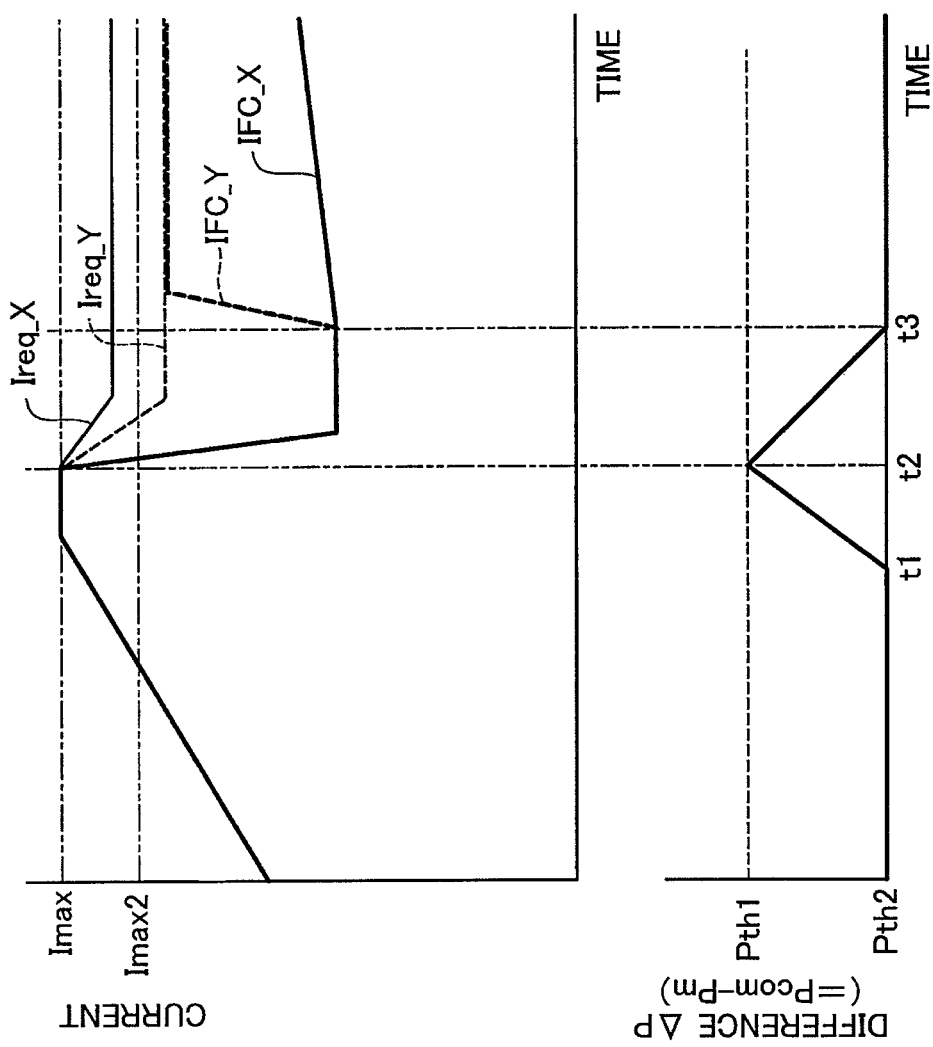
FIG. 3 is a timing diagram for the fuel cell system.

FIG. 3 is a timing diagram for the fuel cell system 10. The lower part of FIG. 3 shows the difference ΔP between the pressure command value Pcom of the fuel gas and the measured value Pm of the pressure of the fuel gas. The upper part of FIG. 3 shows a current Ireq_X and a current Ireq_Y each required for achieving a requested amount of power generation, and an output current IFC_X and an output current IFC_Y from the fuel cell 100. The currents Ireq_X and IFC_X show exemplary waveforms determined when a transition is made to step S150 in FIG. 2. The currents Ireq_Y and IFC_Y show exemplary waveforms determined when a transition is made to step S160 in FIG. 2.

The transition to step S150 will be described first. If a requested amount of power generation requested for the fuel cell 100 increases, the current Ireq_X corresponding to the requested amount of power generation increases. The output current IFC_X from the fuel cell 100 also increases. If the sum of the amount of the fuel gas consumed by the power generation and the amount of the fuel gas discharged from the gas and water discharge valve 295 during discharge of gas and water becomes larger than the amount of the fuel gas supplied to the fuel cell 100, the difference ΔP between the pressure command value Pcom of the fuel gas and the measured value Pm of the pressure of the fuel gas increases after time t1. When the difference ΔP becomes the first determination value Pth1 at time t2, the power controller 41 starts imposing a current limit. This reduces the output current IFC_X from the fuel cell 100 and reduces the difference ΔP. When the difference ΔP becomes the second determination value Pth2 or less at time t3, the power controller 41 removes the current limit. The requested amount of power generation exceeds 85% of an upper limit of the capability of the fuel cell 100 to generate power (maximum power generation amount) at the time t3. Thus, to reduce the likelihood that a current limit will be imposed again, the power controller 41 removes the current limit gently at the first increase rate Iv1. FIG. 3 shows the current Ireq_X corresponding to the requested amount of power generation instead of the requested amount of power generation. At the time t3, the current Ireq_X exceeds a current Imax2 corresponding to 85% of the maximum power generation amount of the fuel cell 100.

The transition to step S160 will be described next. The waveforms in this transition follow the same course until the time t2 as the waveforms determined by the transition to step S150 but take different courses after the time t2. At the time t3, the requested amount of power generation does not exceed 85% of an upper limit of the capability of the fuel cell 100 to generate power (maximum power generation amount), and the current Ireq_Y corresponding to the requested amount of power generation is lower than the current Imax2 corresponding to 85% of the maximum power generation amount of the fuel cell 100. In this case, it is unlikely that a current limit will be imposed again. Thus, the power controller 41 removes the current limit steeply at the second increase rate Iv2. As a result, a driver is unlikely to have the feeling of worsened drivability.

According to the embodiment described above, for removal of a current limit, if a requested amount of power generation exceeds a threshold determined in advance falling below a rated power generation amount of the fuel cell 100, the power controller 41 removes the current limit at the first increase rate determined in advance. This makes it possible to reduce the likelihood that a current limit will be imposed again during removal of the current limit. Meanwhile, if the requested amount of power generation is the threshold or less, the power controller 41 removes the current limit at the second increase rate higher than the first increase rate. As a result, a driver is unlikely to have the feeling of worsened drivability.

The power controller 41 determines fulfillment of a condition for the limit based on at least both of the first condition under which the requested amount of power generation exceeds an upper limit range of power generation including the rated power generation amount of the fuel cell 100, and the second condition under which supply of the fuel gas is insufficient so generated power does not commensurate with the requested amount of power generation. This makes it possible to reduce the likelihood that a current limit will be imposed while supply of the fuel gas is temporarily insufficient but the insufficient supply of the fuel gas is expected to be made up for immediately, for example. The power controller 41 may use a condition other than the first condition and the second condition for the determination. The power controller 41 may make the determination using an output current from the fuel cell 100, for example.

If the difference ΔP between the pressure Pcom of the fuel gas required for fulfilling the requested amount of power generation and the pressure Pm of the fuel gas supplied to the fuel cell 100 is the first determination value Pth1 or more, the power controller 41 may determine that the second condition for imposing the current limit is fulfilled. This allows the power controller 41 to determine the fulfillment of the second condition reliably. The power controller 41 may use a condition other than this condition for the determination. The power controller 41 may make the determination using an output current from the fuel cell 100, for example.

If the difference ΔP between the pressure Pcom of the fuel gas required for fulfilling the requested amount of power generation and the pressure Pm of the fuel gas supplied to the fuel cell 100 is the second determination value Pth2 or less lower than the first determination value Pth1, the power controller 41 determines that the second condition has been solved and removes the current limit. This makes it possible to reduce the likelihood that a current limit will be imposed again after the current limit is removed. The power controller 41 may use a condition other than this condition for the determination. The power controller 41 may make the determination using an output current from the fuel cell 100 and the amount of the fuel gas supplied to the fuel cell 100 after the power controller 41 starts imposing the current limit, for example.

In the description of step S130 in FIG. 2, the power controller 41 uses the second determination value Pth2 lower than the first determination value Pth1 instead of the first determination value Pth1 for making the determination in step S130. Alternatively, the first determination value Pth1 may be used for making the determination in step S130.

The fuel cell system 10 described in the foregoing embodiment is applicable to buses, trucks, dual-mode vehicles, and trains, in addition to passenger vehicles with fuel cells, for example.

The present disclosure is not limited to the above-described embodiment or other embodiments but is feasible in the form of various configurations within a range not deviating from the substance of the disclosure. For example, technical features in the embodiment or those in the other embodiments corresponding to technical features in each aspect described in SUMMARY may be replaced or combined, where appropriate, with the intention of solving some or all of the foregoing problems or achieving some or all of the foregoing effects. Unless being described as absolute necessities in this specification, these technical features may be deleted, where appropriate.

The present disclosure is feasible in the following aspects.

According to one aspect of the present disclosure, a fuel cell system is provided. The fuel cell system comprises: a fuel cell generating power in response to supply of fuel gas; a fuel gas supply unit supplying the fuel gas to the fuel cell; a power controller connected to a power supply line to receive generated power output from the fuel cell, the power controller being capable of doing a current limit to reduce at least a current value of power to be supplied to outside from the fuel cell; and a power generation controller controlling at least supply of the fuel gas supplied by the fuel gas supply unit to operate the fuel cell to fulfill a requested amount of power generation requested for the fuel cell. The power controller starts imposing the current limit when a condition for the current limit is met the condition, the condition being that the fuel cell does not generate to fulfill the requested amount of power generation while the fuel cell generates power at an upper limit of the supply capability of the fuel gas supply unit, and the power controller removes the current limit at a first predetermined increase rate determined when the requested amount of power generation exceeds a predetermined threshold below a rated power generation amount of the fuel cell and at a second increase rate higher than the first increase rate when the requested amount of power generation is the threshold or less, after the condition for the limit is dissolved.

According to this aspect, for removal of the current limit, the power controller removes the current limit at the first increase rate determined in advance when the requested amount of power generation exceeds the threshold determined in advance falling below a rated power generation amount of the fuel cell. This makes it possible to reduce the likelihood that a current limit will be imposed again during removal of the current limit. Meanwhile, when the requested amount of power generation is the threshold or less, the power controller removes the current limit at the second increase rate higher than the first increase rate. This allows the fuel cell to generate power of the requested amount of power generation easily.

In the fuel cell system of the foregoing aspect, the power controller may determine the condition is met for the limit based on both of a first condition under which the requested amount of power generation exceeds an upper limit range of power generation including the rated power generation amount of the fuel cell, and a second condition under which supply of the fuel gas is insufficient so generated power does not commensurate with the requested amount of power generation, and the power controller may determine the removing of the limiting based on the second condition. According to this aspect, the power controller makes the determination based on both of the first condition under which the requested amount of power generation is in the upper limit range of power generation by the fuel cell, and the second condition under which supply of the fuel gas is insufficient so generated power does not commensurate with the requested amount of power generation. This makes it possible to reduce the likelihood that a current limit will be imposed while supply of the fuel gas is temporarily insufficient but the insufficient supply of the fuel gas is expected to be made up for immediately, for example.

In the fuel cell system of the foregoing aspect, t the power controller may determine that the second condition for imposing the current limit is met when a difference between the pressure of the fuel gas required for fulfilling the requested amount of power generation and the pressure of the fuel gas supplied to the fuel cell is a first determination value or more. This allows the power controller to determine the fulfillment of the second condition reliably.

In the fuel cell system of the foregoing aspect, the power controller may determine that the second condition has been dissolved and removes the current limit when the difference between the pressure of the fuel gas required for fulfilling the requested amount of power generation and the pressure of the fuel gas supplied to the fuel cell is a second determination value or less lower than the first determination value. According to this aspect, when the difference between the pressure of the fuel gas required for fulfilling the requested amount of power generation and the pressure of the fuel gas supplied to the fuel cell is the second determination value or less lower than the first determination value, the current limit is removed. This makes it possible to reduce the likelihood that a current limit will be imposed again after the current limit is removed.

What is claimed is:

1. A fuel cell system comprising:
a fuel cell generating power in response to supply of fuel gas;
a fuel gas supply unit supplying the fuel gas to the fuel cell;
a power controller provided in a power supply line to receive generated power output from the fuel cell, the power controller configured to supply power generated by the fuel cell to outside from the fuel cell; and
a power generation controller configured to control at least supply of the fuel gas supplied by the fuel gas supply unit to operate the fuel cell to fulfill a requested amount of power generation requested for the fuel cell,
wherein the power controller is programmed to:
when a condition for limiting the current drawn from the fuel cell is met, limit the current drawn from the fuel cell to be lower than a current value that fulfills the requested amount of power generation so as to supply an amount of power smaller than the requested amount of power generation to outside from the fuel cell, the condition being that the fuel cell does not generate sufficient power to fulfill the requested amount of power generation while the fuel cell generates power at an upper limit of a supply capability of the fuel gas supply unit, and
after the condition for limiting the current is dissolved, remove the limit of the current drawn from the fuel cell so as to increase the power to be supplied to outside from the fuel cell to fulfill the requested amount of power generation, wherein the power controller is programmed to remove the limit of the current drawn from the fuel cell by:
increasing the current drawn from the fuel cell at a first predetermined increase rate when the requested amount of power generation exceeds a predetermined threshold below a rated power generation amount of the fuel cell, and
increasing the current drawn from the fuel cell at a second increase rate higher than the first predetermined increase rate when the requested amount of power generation is equal to or less than the predetermined threshold.

2. The fuel cell system in accordance with claim 1, wherein the power controller is programmed to:
determine that the condition for limiting the current drawn from the fuel cell is dissolved based on both of a first condition under which the requested amount of power generation exceeds an upper limit range of power generation including the rated power generation amount of the fuel cell, and a second condition under which the supply of the fuel gas to the fuel cell is insufficient so generated power does not commensurate with the requested amount of power generation, and
determine to remove the limit of the current drawn from the fuel cell based on the second condition.

3. The fuel cell system in accordance with claim 2, wherein the power controller is programmed to:
determine that the second condition is met when a difference between a pressure of the fuel gas required for fulfilling the requested amount of power generation and the pressure of the fuel gas supplied to the fuel cell is equal to or greater than a first determination value.

4. The fuel cell system in accordance with claim 3, wherein the power controller is programmed to:
determine that the second condition has been dissolved and remove the limit of the current drawn from the fuel cell when the difference between the pressure of the fuel gas required for fulfilling the requested amount of power generation and the pressure of the fuel gas supplied to the fuel cell is equal to or less than a second determination value that is lower than the first determination value.

5. The fuel cell system in accordance with claim 1, wherein
the power controller includes a current regulating device configured to regulate the amount of current drawn from the fuel cell, and
the power controller is programmed to:
control the current regulating device to limit the current drawn from the fuel cell to be lower than the current value that fulfills the requested amount of power generation when the condition is met, and
control the current regulating device to remove the limit of the current drawn from the fuel cell after the condition is dissolved.

6. The fuel cell system in accordance with claim 5, wherein the power controller is programmed to:
control the current regulating device to increase the current drawn from the fuel cell at the first predetermined increase rate when the requested amount of power generation exceeds the predetermined threshold; and
control the current regulating device to increase the current drawn from the fuel cell at the second increase rate when the requested amount of power generation is equal to or less than the predetermined threshold.

7. The fuel cell system in accordance with claim 5, wherein the current regulating device includes a DC-DC converter or an inverter.

* * * * *